United States Patent [19]

Mattson et al.

[11] 4,325,163

[45] Apr. 20, 1982

[54] PORTABLE BLOWER-VACUUM UNIT

[75] Inventors: Charles A. Mattson, Woodland Hills; George M. Zink, Simi Valley; Douglas A. Milliken, Thousand Oaks, all of Calif.

[73] Assignee: Allegretti & Company, Chatsworth, Calif.

[21] Appl. No.: 138,166

[22] Filed: Apr. 7, 1980

[51] Int. Cl.³ .............................................. B02C 18/06
[52] U.S. Cl. ......................................... 15/330; 15/337; 15/339; 15/405; 241/56; 415/121 G
[58] Field of Search ................ 15/339, 405, 330, 331, 15/328, 337; 415/121 G; 241/56

[56] References Cited

U.S. PATENT DOCUMENTS

| 1,086,591 | 2/1914 | Fulton | 15/344 X |
| 1,583,528 | 5/1926 | Clements | 15/344 X |
| 1,749,373 | 3/1930 | Breuer | 15/344 X |
| 2,598,499 | 5/1952 | Breuer et al. | 15/330 X |
| 3,618,157 | 11/1971 | Bassin | 15/331 X |
| 3,712,353 | 1/1973 | Ferry | 241/56 X |
| 3,968,938 | 7/1976 | Ruhl et al. | 15/40 S X |

Primary Examiner—Chris K. Moore
Attorney, Agent, or Firm—Fulwider, Patton, Rieber, Lee & Utecht

[57] ABSTRACT

A portable blower-vacuum unit has an impeller for drawing air axially through a housing air inlet, and for discharging the air centrifugally through a tangential housing air outlet. In a blower mode, a perforate cover plate prevents ingestion of solid material by the impeller. In a vacuum mode, a vacuum conduit connects to the housing in lieu of the cover plate, and a vacuum bag attaches to the air outlet. A mulching blade rotates with the impeller to chop any solid material passing through the housing when the unit is operated in the vacuum mode.

23 Claims, 4 Drawing Figures

PORTABLE BLOWER-VACUUM UNIT

BACKGROUND OF THE INVENTION

This invention relates in general to portable air blower apparatus and the like. More specifically, this invention relates to a portable combination blower-vacuum apparatus which is quickly and easily interchangeable between blower and vacuum mode operation.

A variety of vacuum devices are available throughout the prior art, and typically comprise a motor-driven impeller for drawing air at a relatively high rate through a flow path. A suction tube or nozzle forms the inlet to the flow path whereby dirt, leaves, and the like are drawn by the impeller into the flow path for capture within a dust bag formed from a suitable filtering material such as a porous fabric or the like. Importantly, in the prior art, this filtering bag is commonly positioned upstream of the impeller so as to prevent contact between the rotating impeller and the solid material being vacuumed.

The prior art includes some vacuum systems adapted for conversion between blower and vacuum mode operation. More specifically, the prior art discloses the use of an impeller alternatively for drawing air through a dust bag for vacuuming solid material, or for blowing air at a relatively high flow rate at an appropriate surface when the dust bag is removed. However, these prior art combination devices have not been widely used because of their relatively complex construction, and because of the attendant difficulties in switching between blower and vacuum modes of operation.

Portable blower units have recently become popular for use in blowing dirt, dust, leaves, and the like from surfaces such as sidewalks, driveways, etc. These devices have become particularly popular in relatively arid areas wherein water for washing or cleaning of these surfaces is not readily available. These portable blower units comprise a lightweight and inexpensive impeller formed from plastic or the like which is rotatably driven in a correspondingly lightweight and inexpensively-formed centrifugal housing. The impeller draws air axially inwardly through a relatively short inlet flow path, and discharges the air from the housing at a relatively high flow rate for blowing of leaves and the like. However, these portable blowing devices are not readily or conveniently adapted for use in a second mode as a vacuum device. More specifically, the compact, lightweight, and inexpensive housing is not configured for mounting of a dust bag upstream of the impeller, and the lightweight impeller is not adapted to accommodate contact with solid material without clogging or breaking.

The present invention overcomes the problems and disadvantages of the prior art by providing a portable blower-vacuum unit specifically designed for use in a blower mode, or in a vacuum mode. The unit is quickly and easily adjusted between modes, and includes means for protecting a relatively lightweight and inexpensive impeller from damage upon contact with solid material in the vacuum mode.

SUMMARY OF THE INVENTION

In accordance with the invention, a combination blower-vacuum unit comprises a drive motor carried in a relatively lightweight portable housing. The motor rotatably drives a relatively lightweight and inexpensive impeller for drawing air at a relatively high flow rate axially inwardly through a housing air inlet, and for centrifugally discharging the same through a tangentially directed housing air outlet. A hinged perforate cover plate is releasably held over the air inlet when the unit is operated in the blower mode whereby air is drawn in by the impeller, and is pumped through the outlet for use in blowing dirt, dust, leaves, and the like from a surface such as a sidewalk or pavement. An elongated nozzle tube is removably secured to the housing outlet for directing the blown air to the desired location.

In the vacuum mode, the hinged cover plate is pivoted away from the air inlet, and the nozzle is secured with respect to the air inlet to form an elongated vacuum tube. The housing outlet is connected to a dust bag or the like whereby vacuumed material drawn through the tube by the impeller into the housing via the air inlet is subsequently discharged through the housing air outlet to the dust bag. Importantly, the impeller carries for rotation therewith a diametrically extending mulching blade of a suitable material such as steel or the like for chopping any solid material drawn into the housing, such as leaves or the like, prior to contact with the impeller.

BRIEF DESCRIPTION OF THE DRAWINGS

The accompanying drawings illustrate the invention. In such drawings.

DETAILED DESCRIPTION OF THE PREFERRED EMBODIMENT

Figure 1:
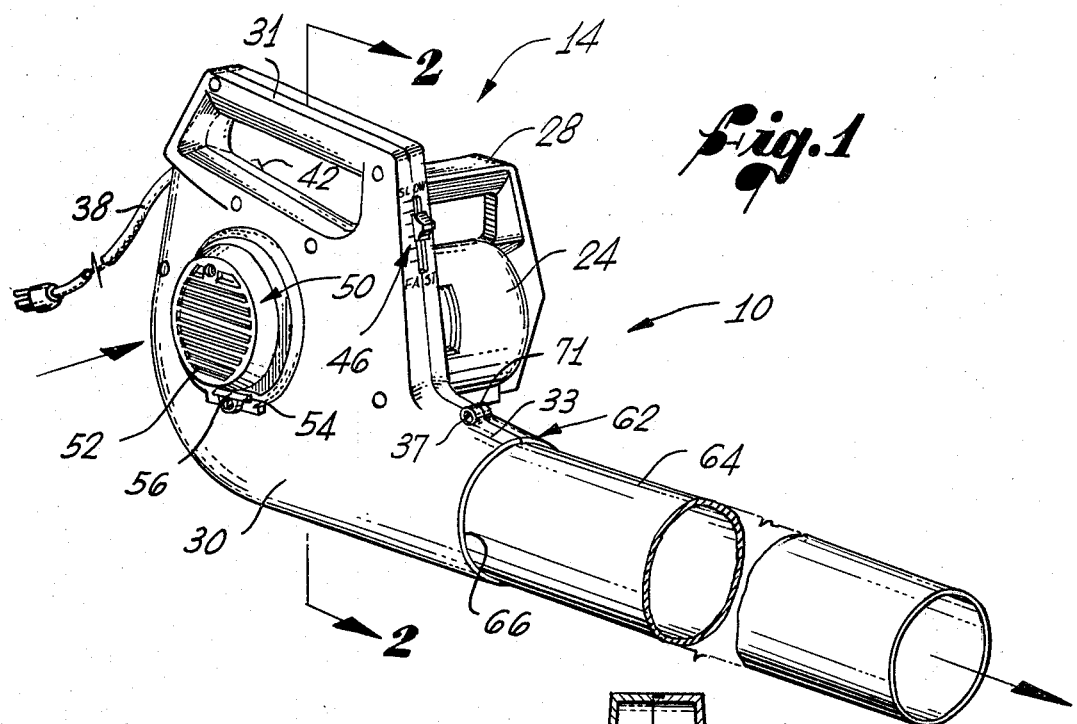
FIG. 1 is perspective view, partially fragmented, of the combination blower-vacuum unit of this invention.

A combination blower-vacuum unit 10 of this invention is illustrated in the drawings, and generally comprises a power-driven motor 12 mounted within a portable and relatively lightweight housing 14 formed from an impact resistant plastic or the like. The motor 12 rotatably drives a relatively lightweight and inexpensively-formed impeller 36 for drawing air axially inwardly through an air inlet 50 at a relatively high flow rate, and for discharging the air centrifugally into a circumferentially-formed chamber 58 and then through a tangentially directed air outlet 62.

Figure 2:
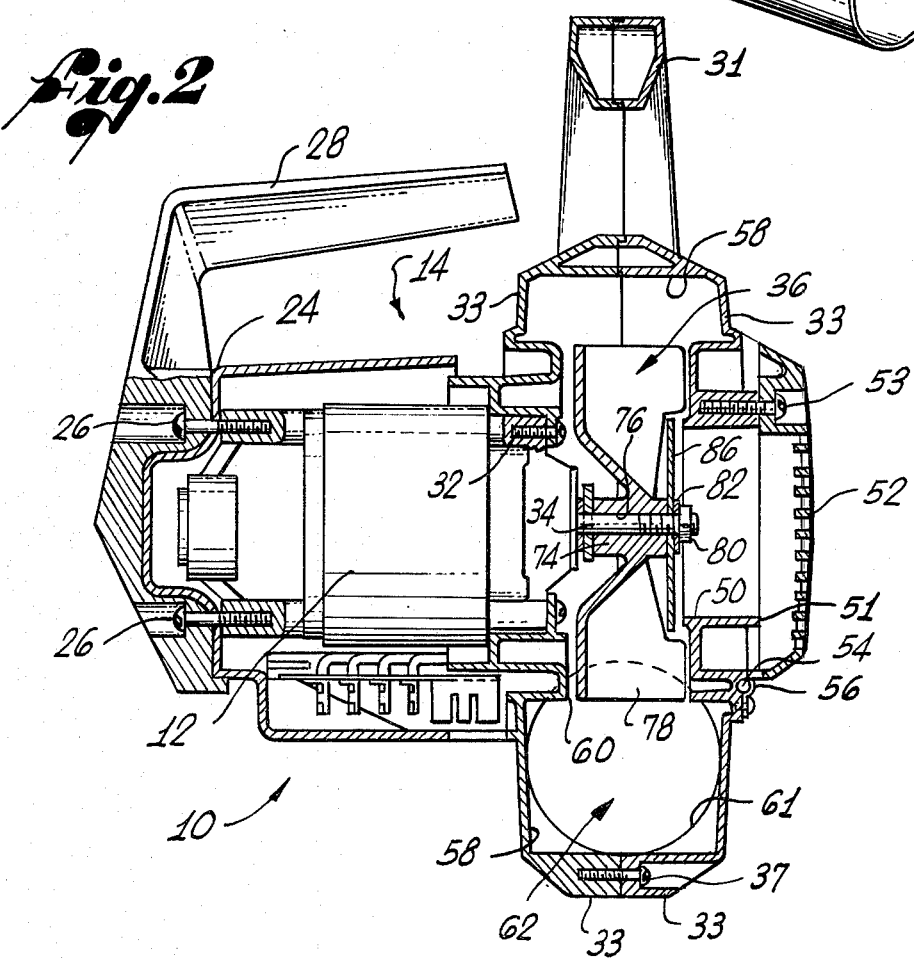
FIG. 2 is an enlarged section taken on line 2—2 of FIG. 1.

The motor 12 is suitably mounted within a motor casing 24 forming a part of the unit housing 14. More specifically, as shown in FIG. 2, the motor casing 24 comprises a generally can-shaped member into which the motor 12 is received. The motor is fixed in position within the casing 24 by a plurality of screws 26 which conveniently also serve to connect a first handle member 28 to the unit housing. The motor 12 is connected at its opposite end to an impeller housing 30 as by another plurality of screws 32, with the impeller housing 30 comprising a second portion of the unit housing 14. Conveniently, the impeller housing 30 includes a second handle member 31. The two handle members 28 and 31 enable the entire unit 10 to be easily handled and oriented in any desired position by the individual operating the unit.

The motor 12 rotatably drives a drive shaft 34 which carries the centrifugal impeller 36 within the impeller housing 30. Power is supplied to the motor 12 by a power cord 38 secured to the impeller housing 30 as by an appropriate connector. The cord 38 in turn is electrically coupled to an on-off switch 42 carried on the impeller housing 30 and operable to couple electrical power to the motor 12 for operation thereof. Conveniently, if desired, the electrical connection includes a variable resistor unit 46 for allowing variable speed control of the motor 12 and resultant variable air flow through the unit. Alternately, if desired, the electric motor 12 may comprise a small gasoline-powered engine, or other suitable portable power source.

The impeller housing 30 is formed from a pair of complementary housing halves 33 secured together as by screws 37, and defining the air inlet 50 in close association with the impeller 36. This air inlet 50 is defined by a cylindrical flange 51 forming an open flow path for axial flow of air into communication with the impeller 36. A perforate cover plate 52 is receivable over the inlet 50 for preventing the operator of the unit from manually contacting the rotating impeller 36 as well as to prevent large objects from being drawn into communication with the impeller. The cover plate 52 is carried on one side by a hinge 54 including a spring 56 for springably biasing the cover plate 52 to a position overlying the air inlet 50. The cover plate 52 is thus movable between a position covering the inlet 50 when the unit is operated in a blower mode, and a position opening the inlet 50 when the unit is operated in a vacuum mode as will be described herein in more detail. For added safety, suitable latching means may be provided for positively locking the cover plate 52 over the inlet 50, such as a screw 53 secured into the impeller housing 30 as shown in FIG. 2, when the unit is operated in the blower mode.

The rotating impeller 36 draws air axially inwardly through the air inlet 50 at a relatively high flow rate. This air is centrifugally discharged from the impeller 36 into an annular chamber 58 defined by the impeller housing 30 circumferentially surrounding the impeller. This chamber 58 communicates via an opening 60 within the housing 30 with a tangentially directed tube 61 forming the air outlet 62 for discharge of the impeller-blown air outwardly at a relatively high flow rate through the air outlet 62. For example, in one embodiment of the invention, the centrifugal impeller 36 was rotably driven at up to about 11,000 R.P.M. to provide an air flow rate of about 300 cubic feet per minute.

As shown in FIGS. 1 and 2, the blower-vacuum unit 10 is adapted for use in a blower mode with the cover plate 52 in its normal position extending over the air inlet 50. In this configuration, air is rapidly drawn axially inwardly by the impeller 36 through the air inlet 50 and the perforate cover plate 52 for centrifugal discharge at a correspondingly high flow rate through the air outlet 62. An elongated nozzle tube 64 has a tapered end 66 for quick, easy, and snug reception into the open end of the tangential air outlet tube 61, and functions in the blower mode to direct the blown air to the desired surface. Conveniently, the opposite end of this nozzle tube 64 may be configured to have an appropriate nozzle geometry for direction of the blown air, or alternately, configured for reception of nozzle ends (not shown) of different geometries.

Figure 3:
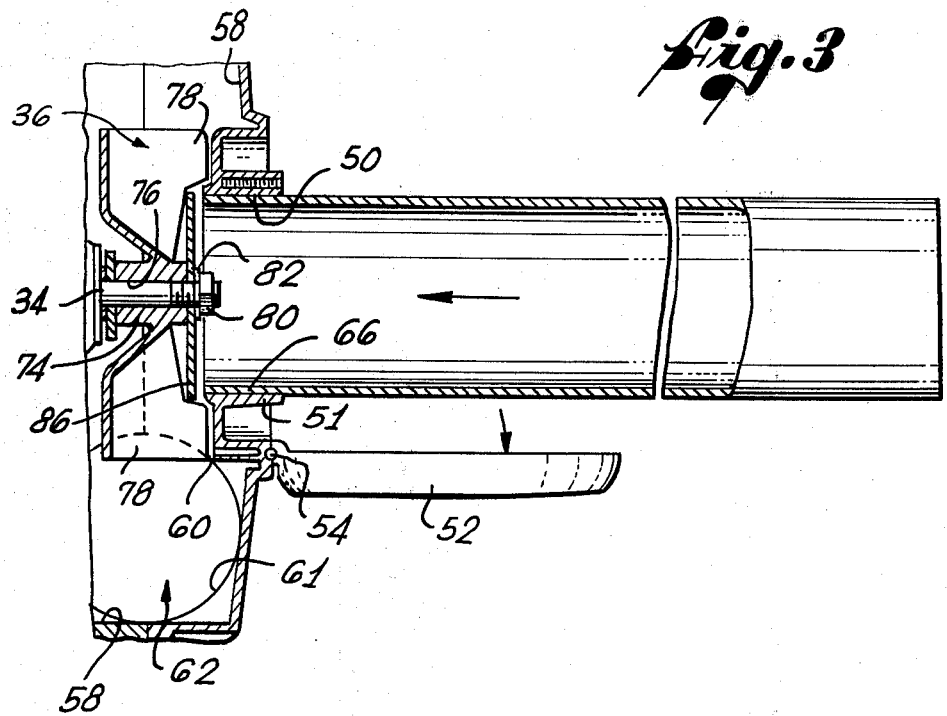
FIG. 3 is an enlarged fragmented portion of the unit illustrating attachment of a vacuum tube.
Figure 4:
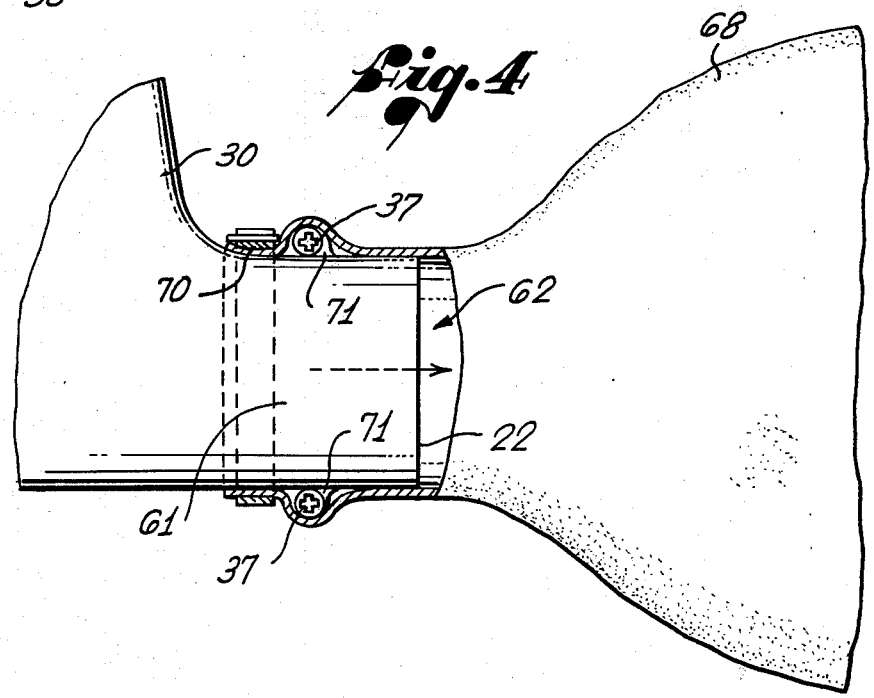
FIG. 4 is an enlarged fragmented portion of the unit illustrating attachment of a vacuum bag.

The blower-vacuum unit 10 of this invention is quickly and easily adapted for use in a vacuum mode by removing the nozzle tube 64 from the air outlet 62, and by mounting over the outlet 62 a dust bag 68 or the like comprising a bag formed from a relatively porous fabric or filtering material. As shown in FIG. 4, the dust bag 68 is easily attached to the outlet 62 by means of a strap 70 secured behind a pair of lugs 71 receiving a pair of the screws 37 holding the housing halves 33 together. Then as shown in FIG. 3, the nozzle tube 64 is repositioned with its tapered end 66 secured within the flange 51 of the air inlet 50. In this configuration, the impeller 36 is operable to vacuum material through the nozzle tube 64 into the impeller housing 30, and then to discharge the material into the dust bag 68. If desired, suitably geometried nozzle ends (not shown) may be provided for connection to the nozzle tube 64 for operating in the vacuum mode.

The impeller 36 is adapted to mulch or chop leaves, grass, and other material vacuumed through the unit to prevent clogging or breaking of the impeller during operation. More specifically, as shown, the impeller 36 comprises a central boss 74 having an axial opening 76 for passage of the motor drive shaft 34. The impeller 36 further includes vanes 78 radiating from the central boss 74 for effecting centrifugal air flow upon impeller rotation. The impeller is desirably formed from a relatively lightweight and inexpensive plastic material, and is secured for rotation on the drive shaft 34 by a lock washer 80 and a nut 82. Importantly, however, the washer 80 and nut 82 also secure upon the boss 74 a chopping or mulching blade 86 presented toward the air inlet 50 and axially spaced slightly from the vanes 78. The blade 86 is formed from steel or the like, and has a length spanning at least the diametric width of the air inlet 50 upon rotation with the impeller 36. In the vacuum mode, the blade 86 functions to chop leaves and other solid vacuumed material to a fine particle size prior to cummunication with the impeller 36. In this manner, damage to or clogging of the impeller 36 is avoided, and the chopped material is freely blown through the impeller housing 30 to the dust bag 68.

The blower-vacuum unit 10 of this invention is thus quickly and easily changed from a blower mode to a vacuum mode, and vice versa. The unit is relatively lightweight and easily portable, and the rotating components of the unit are unaltered regardless of the mode of operation. A single nozzle tube 64 is conveniently provided with the unit for use as an outlet blower nozzle tube in the blower mode, and as an air inlet vacuum nozzle tube in the vacuum mode. The dust bag 68 is quickly and easily attached to and detached from the unit for easy adjustment of the unit between modes.

A wide variety of modification and improvements of the invention disclosed herein are believed to be possible within the skill of the art. For example, the chopping blade 86 may be configured for quick and easy attachment in any suitable manner to the impeller of a conventional portable blower unit to adapt the unit for dual mode operation in either a blower mode or a vacuum mode. Accordingly, no limitation on the invention is intended by way of the description herein except as set forth in the appended claims.

I claim:
1. A blower-vacuum unit for selective operation in a blower mode, and in a vacuum mode, comprising:
   a housing including means forming an air inlet and an air outlet;
   a motor carried by said housing;

an impeller rotatably driven by said motor and positioned within said housing for drawing air into said housing through said air inlet, and for pumping the drawn air out of said housing through said air outlet;

nozzle tube means securable with respect to said housing in flow alignment with said air outlet when the unit is operated in the blower mode, and in flow alignment with said air inlet when the unit is operated in the vacuum mode;

a protective perforate cover plate movable to a position overlying said air inlet when the unit is operated in the blower mode;

hinge means for hingedly connecting said cover plate to said housing; and a vacuum bag securable to said housing for receiving the drawn air pumped out of said housing when the unit is operated in the vacuum mode.

2. The unit of claim 1 wherein said housing comprises a portable housing including handle means formed thereon.

3. The unit of claim 1 wherein said impeller comprises a centrifugal impeller, said housing inlet and outlet forming means defining an axially open air inlet for admission of air axially into communication with said impeller, a circumferential chamber substantially surrounding said impeller for radial discharge of air into said chamber, and a tangential air outlet formed generally tangentially with respect to said chamber.

4. The unit of claim 3 wherein said means forming said air inlet comprises a generally cylindrical flange formed on said housing, said tube means comprising an elongated tube having one end tapered to a reduced cross section for snug reception within said flange when the unit is operated in a vacuum mode.

5. The unit of claim 3 wherein said means forming said air outlet comprises a generally tangentially directed outlet opening formed in said housing, said nozzle means comprising an elongated tube having one end tapered to a reduced cross section for snug reception within said outlet opening when the unit is operated in a blower mode.

6. The unit of claim 1 wherein said motor includes a drive shaft, said impeller being mounted for rotation with said drive shaft.

7. The unit of claim 6 including blade means carried for rotation along with said impeller for chopping solid material drawn into said housing along with the drawn air prior to communication with said impeller, wherein said blade means comprises an elongated blade having a length at least as great as the cross-sectional dimension of said air inlet.

8. The unit of claim 7 wherein said impeller is formed from a relatively lightweight plastic material, and wherein said blade means is formed from a metal material.

9. The unit of claim 1 including means for securing said vacuum bag to said housing.

10. The unit of claim 1 including means for retaining said cover plate in a position overlying said air inlet.

11. The unit of claim 1 including a spring for urging said cover plate to a normal position overlying said air inlet.

12. A blower-vacuum unit, comprising:
a housing having means forming an air inlet and an air outlet;
a motor carried by said housing;

an impeller rotatably driven by said motor and positioned for drawing air into said housing through said air inlet, and for discharging the drawn air through said air outlet;

a protective perforate cover plate movably mounted on said housing and movable between a position overlying said air inlet when the unit is operated in a blower mode, and a position opening said air inlet when the unit is operated in a vacuum mode; and hinge means for hingedly connecting said cover plate to said housing.

13. The unit of claim 12 wherein said impeller comprises a centrifugal impeller, said housing inlet forming means comprising a generally cylindrical flange formed on said housing and defining an axially open air inlet for admission of air axially into communication with said impeller, said housing including a circumferential chamber surrounding said impeller for radial discharge of air into said chamber, and said housing outlet forming means comprising a tangential air outlet communicating with said chamber and formed generally tangentially with respect thereto.

14. The unit of claim 13 including nozzle tube means securable with respect to said housing in flow alignment with said air outlet when the unit is operated in a blower mode and securable with respect to said housing in flow alignment with said air inlet when the unit is operated in a vaccum mode, and a vacuum bag securable to said housing for receiving the drawn air discharged through said air outlet when the unit is operated in a vacuum mode.

15. The unit of claim 12 including blade means carried for rotation along with said impeller for chopping solid material drawn into said housing along with the drawn air prior to communication with said impeller, wherein said blade means comprises an elongated blade having a length at least as great as the cross-sectional dimension of said air inlet.

16. The unit of claim 12 including a spring for urging said cover plate to a normal position overlying said air inlet.

17. A blower-vacuum unit for selective operation in a blower mode, and in a vacuum mode, comprising:
a housing having means forming an air inlet and an air outlet;
a motor carried within said housing;
an impeller rotatably driven by said motor and positioned for drawing air at a relatively high flow rate into said housing through said air inlet, and for discharging the same from said housing through said air outlet;
a protective perforate cover plate movably mounted on said housing and movable between a position overlying said air inlet when the unit is operated in a blower mode, and a position opening said air inlet when the unit is operated in a vacuum mode;
hinge means for hingedly connecting said cover plate to said housing; and
means for urging said cover plate to a normal position overlying said air inlet.

18. The unit of claim 17 including nozzle means securable with respect to said housing in flow alignment with said air outlet when the unit is operated in a blower mode and securable with respect to said housing in flow alignment with said air inlet when the unit is operated in a vacuum mode, and a vacuum bag securable to said housing for receiving the drawn air discharged through said air outlet when the unit is operated in a vacuum mode.

19. A blower-vacuum unit for selective operation in a blower mode, and in a vacuum mode, comprising:
a housing including means forming an air inlet and an air outlet;
a motor carried by said housing;
an impeller rotatably driven by said motor and positioned within said housing for drawing air into said housing through said air inlet, and for pumping the drawn air out of said housing through said air outlet;
nozzle tube means securable with respect to said housing in flow alignment with said air outlet when the unit is operated in the blower mode, and in flow alignment with said air inlet when the unit is operated in the vacuum mode;
a protective perforate cover plate for movement to a position overlying said air inlet when the unit is operated in the blower mode;
hinge means for hingedly connecting said cover plate to said housing;
retaining means for selectively retaining said cover plate in said position overlying said air inlet; and
a vacuum bag securable to said housing for receiving the drawn air pumped out of said housing when the unit is operated in the vacuum mode.

20. A blower-vacuum unit for selective operation in a blower mode, and in a vacuum mode, comprising:
a housing including means forming an air inlet and an air outlet;
a motor carried by said housing;
an impeller rotatably driven by said motor and positioned within said housing for drawing air into said housing through said air inlet, and for pumping the drawn air out of said housing through said air outlet;
an elongated blade mounted axially adjacent said impeller for rotation along with said impeller, said blade being interposed between said impeller and said air inlet and having a length spanning at least the cross-sectional dimension of said air inlet, said blade being formed from a material for chopping solid material drawn into said housing along with the drawn air prior to communication with said impeller;
nozzle tube means securable with respect to said housing in flow alignment with said air outlet when the unit is operated in the blower mode, and in flow alignment with said air inlet when the unit is operated in the vacuum mode;
a protective perforate cover plate movable to a position overlying said air inlet when the unit is operated in the blower mode; and
a vacuum bag securable to said housing for receiving the drawn air pumped out of said housing when the unit is operated in the vacuum mode.

21. The unit of claim 20 wherein said impeller is formed from a relatively lightweight plastic material, and wherein said blade is formed from a metal material.

22. A blower-vacuum unit, comprising:
a housing having means forming an air inlet and an air outlet;
a motor carried by said housing;
a drive shaft rotatably driven by said motor;
an impeller mounted on said drive shaft for rotation therewith and positioned for drawing air into said housing through said air inlet, and for discharging the drawn air through said air outlet; and
an elongated blade mounted axially adjacent said impeller for rotation along with said impeller, said blade being positioned axially between said impeller and said air inlet and having a length spanning at least the cross-sectional dimension of said air inlet, said blade being formed from a material for chopping solid material drawn into said housing along with the drawn air prior to communication with said impeller.

23. A blower-vacuum unit for selective operation in a blower mode, and in a vacuum mode, comprising:
a housing having means forming an air inlet and an air outlet;
a motor carried within said housing;
a drive shaft rotatably driven by said motor;
an impeller mounted on said drive shaft for rotation therewith, said impeller being formed from a relatively lightweight plastic material and positioned generally on a common axis with said air inlet for drawing air at a relatively high flow rate axially into said housing through said air inlet, and for discharging the same from said housing through said air outlet;
an elongated blade mounted on said drive shaft in axially bearing engagement with said impeller for rotation therewith, said blade means being positioned between said impeller and said air inlet and having a length spanning at least the cross-sectional dimension of said air inlet, said blade being formed from a metal material for chopping solid material drawn into said housing along with the drawn air prior to communication with said impeller; and
a protective perforate cover plate movably mounted on said housing and movable between a position overlying said air inlet when the unit is operated in a blower mode, and a position opening said air inlet when the unit is operated in a vacuum mode.

* * * * *